(12) United States Patent
Sakurai

(10) Patent No.: US 10,930,906 B2
(45) Date of Patent: Feb. 23, 2021

(54) BATTERY MODULE

(71) Applicant: HONDA MOTOR CO., LTD., Tokyo (JP)

(72) Inventor: Atsushi Sakurai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 98 days.

(21) Appl. No.: 15/989,959

(22) Filed: May 25, 2018

(65) Prior Publication Data

US 2019/0013501 A1  Jan. 10, 2019

(30) Foreign Application Priority Data

Jul. 6, 2017 (JP) .............................. JP2017-132852

(51) Int. Cl.
*H01M 2/10* (2006.01)
*B60K 1/04* (2019.01)
(Continued)

(52) U.S. Cl.
CPC .............. *H01M 2/1077* (2013.01); *B60K 1/04* (2013.01); *H01M 2/305* (2013.01);
(Continued)

(58) Field of Classification Search
CPC ............... H01M 2/1077; H01M 2/305; H01M 2220/20; B60K 1/04
See application file for complete search history.

(56) References Cited

U.S. PATENT DOCUMENTS 5,766,801 A * 6/1998 Inoue .................. H01M 2/0245
429/159
6,117,587 A   9/2000 Kitami et al.
(Continued)

FOREIGN PATENT DOCUMENTS

CN       205609590 U  *  9/2016
CN       106531913 A      3/2017
(Continued)

OTHER PUBLICATIONS

Cao Gen, Battery Module End Plate and Battery Module, CN106654103A, May 10, 2017, Google Patents, machine translation (Year: 2017).*

(Continued)

*Primary Examiner* — Sean P Cullen
(74) *Attorney, Agent, or Firm* — Paratus Law Group, PLLC

(57) ABSTRACT

A battery module includes: a cell stack body that is constituted by a plurality of cells stacked in a front-rear direction; a pair of end plates disposed on a front surface and rear surface of the cell stack body; and a pair of side frames disposed on the left surface and right surface of the cell stack body. The end plates each includes: an inner wall extending along the cell stack body; an outer wall spaced from the inner wall and facing the inner wall; a plurality of connection walls connecting the inner wall and the outer wall with each other; and a plurality of hollow portions formed by the inner wall, the outer wall, and the connection walls and extending in an up-down direction. A thickness of the connection walls is thinner than a thickness of the inner wall.

7 Claims, 5 Drawing Sheets

(51) Int. Cl.
  *H01M 2/30* (2006.01)
  *H01M 10/04* (2006.01)

(52) U.S. Cl.
  CPC ...... *H01M 2/1094* (2013.01); *H01M 10/0481* (2013.01); *H01M 2220/20* (2013.01)

(56) References Cited

U.S. PATENT DOCUMENTS

| | | | |
|---|---|---|---|
| 2011/0155485 A1* | 6/2011 | Tsurumi | H01M 2/0237 180/65.1 |
| 2013/0171491 A1* | 7/2013 | Wei | H01M 10/6555 429/120 |
| 2013/0189559 A1* | 7/2013 | Giere | H01M 2/1077 429/120 |
| 2014/0349164 A1 | 11/2014 | Park et al. | |
| 2016/0013467 A1* | 1/2016 | Kawata | H01M 2/1077 429/159 |
| 2016/0240827 A1 | 8/2016 | Sakurai | |
| 2016/0308186 A1 | 10/2016 | Han | |
| 2017/0012259 A1 | 1/2017 | Lin et al. | |
| 2017/0092911 A1 | 3/2017 | Nishikawa | |
| 2017/0194676 A1 | 7/2017 | Omura | |
| 2017/0237113 A1 | 8/2017 | Ruehle et al. | |
| 2018/0183033 A1 | 6/2018 | You | |
| 2018/0212212 A1* | 7/2018 | Cao | H01M 2/1005 |
| 2018/0351142 A1 | 12/2018 | Aoki et al. | |

FOREIGN PATENT DOCUMENTS

| | | |
|---|---|---|
| CN | 206250254 U | 6/2017 |
| JP | 3426445 B2 | 7/2003 |
| JP | 2011-023302 A | 2/2011 |
| JP | 2014-229615 A | 12/2014 |
| JP | 2015-011819 A | 1/2015 |
| JP | 2016-149244 A | 8/2016 |
| JP | 2017-069004 A | 4/2017 |
| WO | WO 2012/139690 A1 | 10/2012 |
| WO | WO 2016/002178 A1 | 1/2016 |
| WO | WO 2016/026678 A1 | 2/2016 |
| WO | WO 2017/057082 A1 | 4/2017 |
| WO | WO 2017/057207 A1 | 4/2017 |

OTHER PUBLICATIONS

Mar. 12, 2019, Japanese Office Action issued for related JP Application No. 2017-132852.

Dec. 3, 2020, Chinese Office Action issued for related CN Application No. 201810579776.1.

* cited by examiner

BATTERY MODULE

CROSS-REFERENCE TO RELATED APPLICATION(S)

This application claims priority from Japanese Patent Application No. 2017-132852 filed on Jul. 6, 2017, the entire contents of which are incorporated herein by reference.

FIELD

The present invention relates to a battery module mounted on an electric vehicle.

BACKGROUND

A battery module has been mounted on an electric vehicle or the like. For example, a battery module is disclosed in Japanese Patent No. 3426445 which includes a cell stack body formed by a plurality of cells stacked in a front-rear direction and having a front surface, a rear surface, a left surface, a right surface, an upper surface, and a lower surface, a pair of end plates disposed on the front surface and the rear surface of the cell stack body, and a side frame connecting the pair of end plates.

In this type of battery module, a load in a cell stacking direction of the battery module (hereinafter, appropriately referred to as a cell thickness constraint reaction force) occurs due to expansion of the cell caused by temperature change and aging deterioration. In recent years, since more active material is packed in the cell along with the high capacity and the high energy density of the cell, the cell thickness constraint reaction force tends to increase.

Since the end plate described in Japanese Patent No. 3426445 1 has a lighting structure having a plurality of hollow portions, it is possible to realize a lighter weight. However, when the rigidity is secured in response to an increase in the cell thickness constraint reaction force, in a case where an impact is received from the outside, there may be a problem in that the impact is input to the cell stack body through the end plate, and the cell stack body is damaged.

SUMMARY

The present invention is to provide a battery module capable of protecting a cell stack body from an impact from the outside while receiving a load in a cell stacking direction along with expansion of a cell.

The invention provides following aspects (1) to (10).

(1) A battery module (e.g., a battery module 1 in an embodiment) including:
a cell stack body (e.g., a cell stack body 2 in an embodiment) that is constituted by a plurality of cells (e.g., cells 21 in an embodiment) stacked in a front-rear direction and includes a front surface, a rear surface, a left surface, a right surface, an upper surface, and a lower surface;
a pair of end plates (e.g., end plates 3 in an embodiment) disposed on the front surface and the rear surface of the cell stack body; and
a pair of side frames (e.g., a side frames 4 in an embodiment) disposed on the left surface and the right surface of the cell stack body, wherein
the end plates each includes:
an inner wall (e.g., an inner wall 31 in an embodiment) extending along the cell stack body;
an outer wall (e.g., an outer wall 32 in an embodiment) spaced from the inner wall and facing the inner wall;
a plurality of connection walls (e.g., a connection wall 33 in an embodiment) connecting the inner wall and the outer wall with each other; and
a plurality of hollow portions (e.g., hollow portions 34 in an embodiment) formed by the inner wall, the outer wall, and the connection walls and extending in an up-down direction, and
a thickness (e.g., a thickness W1 in an embodiment) of the connection walls is thinner than a thickness (e.g., a thickness W2 in an embodiment) of the inner wall.

(2) The battery module according to (1), wherein
the thickness of the connection walls is thinner than a thickness (e.g., a thickness W3 in an embodiment) of the outer wall.

(3) The battery module according to (1) or (2), wherein
the end plates each includes:
a left end plate portion (e.g., a left end plate portion 36L in an embodiment);
a right end plate portion (e.g., a right end plate portion 36R in an embodiment), and
a central end plate portion (e.g., a central end plate portion 35 in an embodiment) interposed between the left end plate portion and the right end plate portion in a left-right direction, and
the central end plate portion has a truss structure due to the hollow portions.

(4) The battery module according to any one of (1) to (3), wherein
the end plates each includes:
a left end plate portion a left end plate portion 36L in an embodiment);
a right end plate portion (e.g., a right end plate portion 36R in an embodiment); and
a central end plate portion (e.g., a central end plate portion 35 in an embodiment) interposed between the left end plate portion and the right end plate portion in a left-right direction, and
a width (e.g., a width W4 in an embodiment) of the central end plate portion in the front-rear direction is thicker than a width (e.g., a width W5 in an embodiment) of the left end plate portion and the right end plate portion in the front-rear direction.

(5) The battery module according to (3) or (4), wherein
the left end plate portion and the right end plate portion each includes a solid portion (e.g., a solid portion 36a in an embodiment),
the pair of side frames each includes:
a side frame body (e.g., a side frame body 41 in an embodiment);
a front wraparound portion (e.g., a front wraparound portion 42F in an embodiment) which turns along the front surface of the cell stack body from the side frame body; and
a rear wraparound portion (e.g., a rear wraparound portion 42R in an embodiment) which turns along the rear surface of the cell stack body from the side frame body,
the front wraparound portions include front fixing portions e.g., a front fixing portion 43F in an embodiment) to be fixed to the solid portions provided in the left end plate portion and the right end plate portion of a front end plate of the pair of end plates, and
the rear wraparound portions include rear fixing portions (e.g., a rear fixing portion 43R in an embodiment) to be fixed to the solid portions provided in the left end plate portion and the right end plate portion of a rear end plate of the pair of end plates.

(6) The battery module according to (5), wherein
an end surface of a fastening member (e.g., a bolt B in an embodiment) fastening the front fixing portion and the front end plate with each other is located on a side of the cell stack body in the front-rear direction compared to an outermost surface of the central end plate portion of the front end plate, and
an end surface of a fastening member (e.g., a bolt B in an embodiment) fastening the rear fixing portion and the rear end plate with each other is located on a side of the cell stack body in the front-rear direction compared to an outermost surface of the central end plate portion of the rear end plate.

(7) The battery module according to any one of (1) to (6), wherein
the inner walls each includes a structure fixing portion (e.g., a structure fixing portion 37 in an embodiment) to be fixed to a structure supporting the battery module.

(8) The battery module according to (7), wherein
the end plates each includes:
a left end plate portion (e.g., a left end plate portion 36L in an embodiment)
a right end plate portion (e.g., a right end plate portion 36R in an embodiment); and
a central end plate portion (e.g., a central end plate portion 35 in an embodiment) interposed between the left end plate portion and the right end plate portion in a left-right direction,
a width (e.g., a width W4 in an embodiment) of the central end plate portion in the front-rear direction is thicker than a width (e.g., a width W5 in an embodiment) of the left end plate portion and the right end plate portion in the front-rear direction,
the front wraparound portions include front fixing portions (e.g., a front fixing portion 43F in an embodiment) to be fixed to the left end plate portion and the right end plate portion of a front end plate of the pair of end plates,
the rear wraparound portions include rear fixing portions a rear fixing portion 43R in an embodiment) to be fixed to the left end plate portion and the right end plate portion of a rear end plate of the pair of end plates, and
the structure fixing portions are located on a side of the cell stack body in the front-rear direction compared to the front fixing portions and the rear fixing portions.

(9) The battery module according to any one of (1) to (8), wherein
the cell stack body includes external connection terminals (e.g., an external connection terminal 23 in an embodiment), and
the inner walls each includes a terminal fixing portion (e.g., a terminal fixing portion 38 in an embodiment) to which the external connection terminal is fixed.

(10) The battery module according to (9), wherein
the end plates each includes:
a left end plate portion a left end plate portion 36L in an embodiment);
a right end plate portion (e.g., a right end plate portion 36R in an embodiment); and
a central end plate portion e.g., a central end plate portion 35 in an embodiment) interposed between the left end plate portion and the right end plate portion in a left-right direction,
a width (e.g., a width W4 in an embodiment) of the central end plate portion in the front-rear direction is thicker than a width (e.g., a width W5 in an embodiment) of the left end plate portion and the right end plate portion in the front-rear direction,
the front wraparound portions include front fixing portions (e.g., a front fixing portion 43F in an embodiment) to be fixed to the left end plate portion and the right end plate portion of a front end plate of the pair of end plates,
the rear wraparound portions include rear fixing portions (e.g., a rear fixing portion 43R in an embodiment) to be fixed to the left end plate portion and the right end plate portion of a rear end plate of the pair of end plates, and
the terminal fixing portions are located on a side of the cell stack body in the front-rear direction compared to the front fixing portion and the rear fixing portion.

According to (1), since the end plate includes the inner wall extending along the cell stack body, the outer wall spaced from the inner wall and facing the inner wall, the connection walls connecting the outer wall and the inner wall, and the hollow portions formed by the inner wall, the outer wall, and the connection walls and extending in the up-down direction, and the thickness of the connection wall is thinner than the thickness of the inner wall, it is possible to protect the cell stack body from an impact from the outside due to the deformation of the connection walls. In addition, it is possible to prevent the cell stack body from being deformed by increasing the thickness of the inner wall.

According to (2), since the thickness of the connection walls is thinner than the thicknesses of the inner wall and the outer wall, while the outer wall receives an impact from the outside and the inner wall protects the cell stack body, the impact from the outside can be absorbed by the deformation of the connection walls.

According to (3), the central end plate portion has a truss structure due to the hollow portions, thereby realizing a lightweight structure resistant to deformation.

According to (4), since the width in the front-rear direction of the central end plate portion is thicker than the width in the front-rear direction of the left end plate portion and the right end plate portion, compared to the end plate with a constant width, it is possible to improve bending strength and flexural rigidity with a lighter weight.

According to (5), the front fixing portions and the rear fixing portions of the side frames are fixed to the solid portions of the left end plate portions and the right end plate portions of the end plates, and it is possible to firmly fix the side frames to the end plates at a high rigidity portion.

According to (6), since the end surfaces of the fastening members fastening the end plates with the front fixing portions and the rear fixing portions are located on the side of the cell stack body in the front-rear direction compared to the outermost surface of the central end plate portions, it is possible not only to avoid protrusion of the fastening members, but also to receive the impact from the outside by the outer wall of the end plate.

According to (7), even when the impact is received from the outside, since the inner wall is prevented from moving due to the deformation of the connection walls, it is also possible to prevent the structure fixing portion from moving by providing the structure fixing portion on the inner wall.

According to (8), since the structure fixing portion is located on the side of the cell stack body in the front-rear direction compared to the front fixing portion and the rear fixing portion of the side frame, before the impact from the outside is transmitted to the structure fixing portion, the impact can be received by the left end plate portion and the right end plate portion of the end plate to which the front fixing portion and the rear fixing portion of the side frame are fixed.

According to (9), even when the impact is received from the outside, since the movement of the inner wall is prevented due to the deformation of the connection walls, it is also possible to prevent the movement of the terminal fixing portion by providing the terminal fixing portion on the inner wall.

According to (10), since the terminal fixing portion is located on the side of the cell stack body in the front-rear direction compared to the front fixing portion and the rear fixing portion of the side frame, before the impact from the outside is transmitted to the terminal fixing portion, the impact can be received by the left end plate portion and the right end plate portion of the end plate to which the front fixing portion and the rear fixing portion of the side frame are fixed.

DETAILED DESCRIPTION

Figure 1:
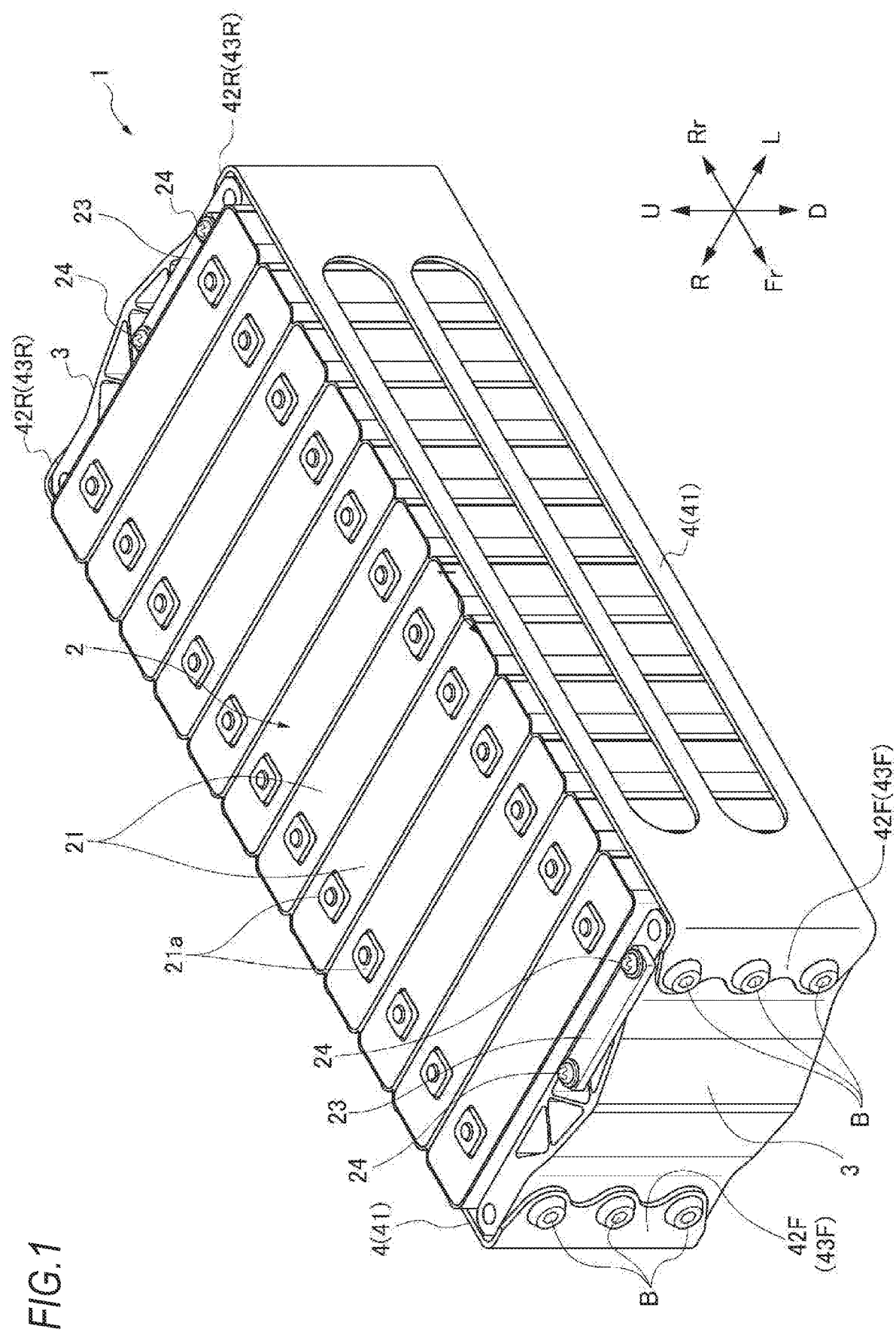
FIG. 1 is a perspective view of a battery module according to a first embodiment of the present invention as viewed obliquely from above.

Battery modules according to embodiments of the present invention will be described with reference to the accompanying drawings. It is noted that the drawings are to be viewed in directions of reference numerals.

First Embodiment

Figure 2:
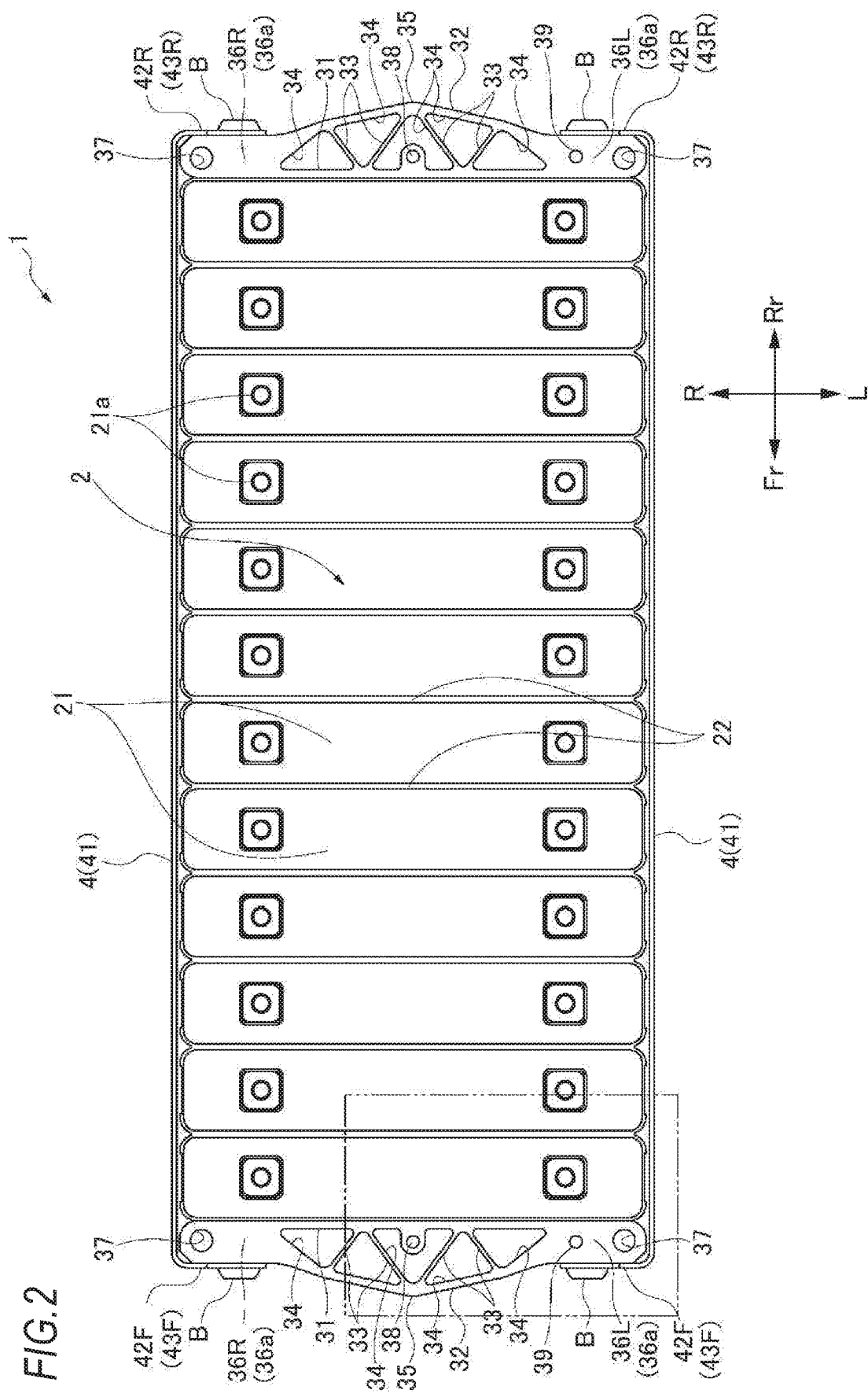
FIG. 2 is a plan view of the battery module according to the first embodiment of the present invention.
Figure 3:
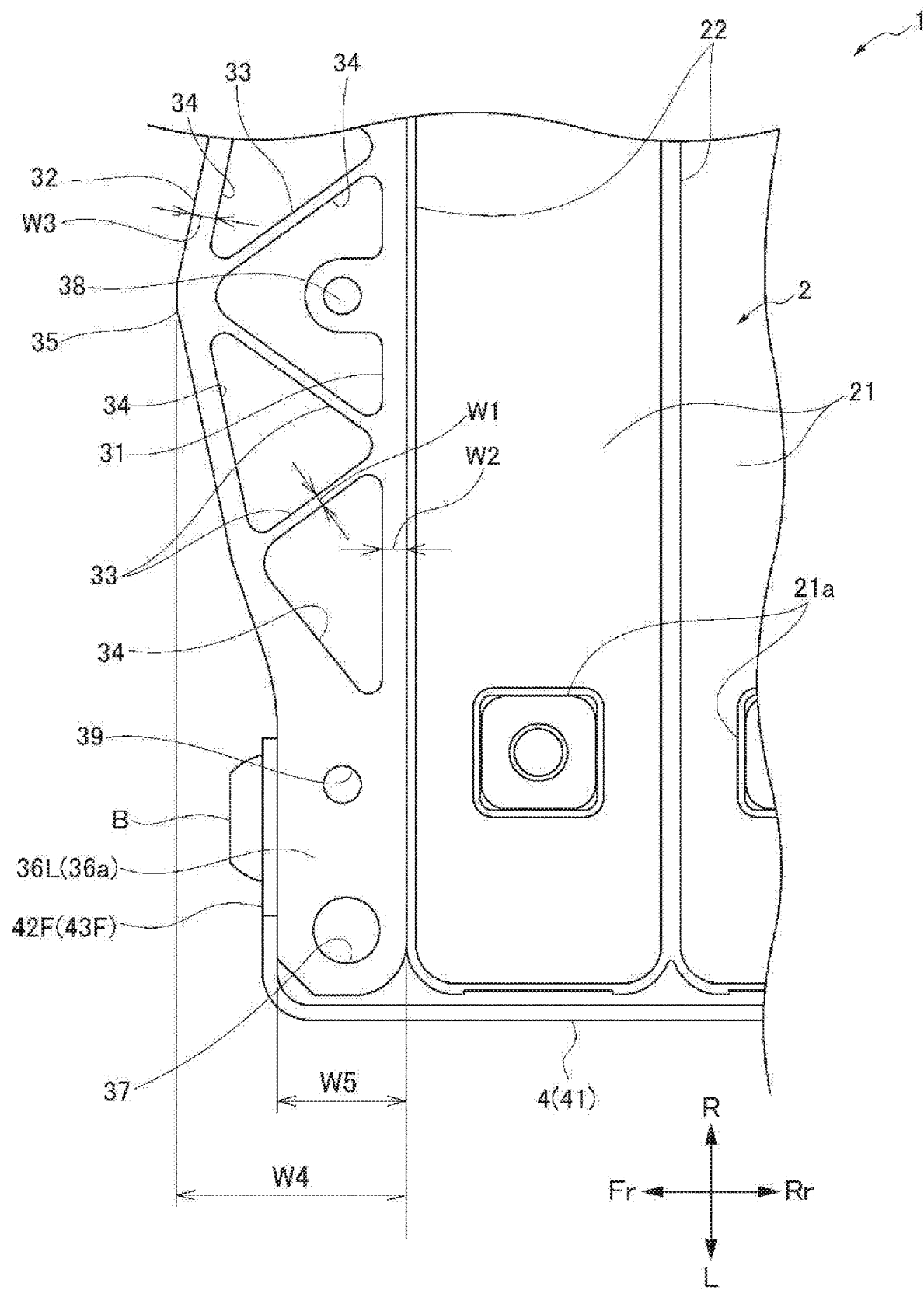
FIG. 3 is a partially enlarged view of FIG. 2.

As illustrated in FIGS. 1 to 3, a battery module 1 according to a first embodiment of the present invention is constituted by a cell stack body 2 in which a plurality of cells 21 are stacked in a front-rear direction, and which includes a front surface, a rear surface, a left surface, a right surface, an upper surface, and a lower surface, a pair of end plates 3 disposed on the front and rear surfaces of the cell stack body 2, and a pair of side frames 4 disposed on the left and right surfaces of the cell stack body 2 for connecting the pair of end plates 3.

For the simple and clear description in this specification, a stacking direction of the cells 21 is defined as a front-rear direction, a direction orthogonal to the stacking direction of the cells 21 is defined as a left-right direction and an up-down direction, and the stacking direction is irrelevant to a front-rear direction or the like of products on which the battery module 1 is mounted. That is, when the battery module 1 is mounted on a vehicle, the stacking direction of the cells 21 may be aligned with a front-rear direction of the vehicle, may be an up-down direction and a left-right direction of the vehicle, or may be inclined with respect to these directions. In the drawings, a front side, a rear side, a left side, a right side, an upper side, and a lower side of the battery module 1 are indicated by Fr, Rr, L, U, and D, respectively.

Cell Stack Body

The cell stack body 2 is formed by a plurality of cells 21 and a plurality of insulation members 22 which are alternately stacked in the front-rear direction. The pair of end plates 3 are respectively disposed on the front and rear surfaces of the cell stack body 2 in an insulation state via the insulation member 22, and the pair of side frames 4 are disposed on the left and right surfaces of the cell stack body 2 in an insulation state via a slight gap therebetween.

It is known that the cell 21 expands due to temperature change or aging deterioration. The cell 21 has a rectangular parallelepiped shape in which a length in the up-down direction is longer than a length in the front-rear direction, and a length in the left-right direction is longer than the length in the up-down direction. Therefore, the front surface and the rear surface of the cell 21 have a much larger area than the left surface, the right surface, the upper surface, and the lower surface, and the front surface and the rear surface of the cell 21 easily expand at a central part in the left-right direction and a central part in the up-down direction thereof.

A plurality of busbars (not illustrated) are disposed on the upper surface of the cell stack body 2 to be electrically connected to terminals 21a of the cells 21. As the busbars, there are busbars for connecting the terminals 21a of the cells 21 with each other or busbars for connecting the terminals 21a of the cells 21 with external connection terminals 23. When the position of the terminal 21a of the cell 21 and the external connection terminal 23 are relatively changed, connection failure may occur. Therefore, it is necessary to fix the external connection terminal 23 at a position where the position of the external connection terminal relative to the terminal 21a of the cell 21 does not relatively change, in the present embodiment, the external connection terminal 23 is fixed to the end plate 3, and movement of the external connection terminal 23 is prevented based on a structure of the end plate to be described below, Side Frame The pair of side frames 4 each includes a side frame body 41 extending along the left surface or the right surface of the cell stack body 2, and a front wraparound portion 42F and a rear wraparound portion 42R which turn around the front surface of the front-side end plate 3 and the rear surface of the rear-side end plate 3 from the front end and the rear end of the side frame body 41. The front wraparound portion 42F and the rear wraparound portion 42R respectively include a front fixing portion 43F and a rear fixing portion 43R to be fixed to the end plate 3.

The front fixing portion 43F and the rear fixing portion 43R have round holes into which bolts B are inserted, and the front wraparound portion 42F and the rear wraparound portion 42R are fixed to the end plates 3 by screwing the bolts B inserted into the round holes into the end plates 3, The side frame 4 in this embodiment is formed by press working a metal plate, but may be formed using an aluminum extrusion.

End Plate

The pair of end plates 3 each contacts with the front surface or the rear surface of the cell stack body 2 through the insulation member 22, and receive a load (hereinafter, also referred to as a cell thickness constraint reaction force as appropriate) in the cell stacking direction of the cell stack body 2. The load in the cell stacking direction of the cell stack body 2 is mainly caused by expansion of the cells 21 due to temperature change or aging deterioration, and since the front surface and the rear surface of the cell 21 easily expand at the central part in the left-right direction and the central part in the up-down direction thereof as described above, a large load is applied to a central part in the left-right direction and a central part in the up-down direction of the end plate 3.

The end plate 3, for example, is formed using an aluminum extrusion material, and includes an inner wall 31 extending along the front surface or the rear surface of the cell stack body 2, an outer wall 32 spaced from the inner wall 31 and facing the inner wall 31, a plurality of connection walls 33 connecting the inner wall 31 with the outer wall 32, and a plurality of hollow portions 34 formed by the inner wall 31, the outer wall 32, and the connection walls 33 and extending in the up-down direction.

The thickness W1 of the connection walls 33 is set to be thinner than the thickness W2 of the inner wall 31 and the thickness W3 of the outer wall 32. For this reason, while the cell stack body 2 is protected by the inner wall 31 thicker than the connection walls 33, the outer wall 32 thicker than the connection walls 33 receives an impact from the outside, and the impact can be absorbed by deformation of the connection walls 33.

The end plate 3 includes a left end plate portion 36L and a right end plate portion 36R with a central end plate portion 35 interposed therebetween in the left-right direction. The central end plate portion 35 includes the plurality of hollow portions 34, and these hollow portions 34 are disposed to form a triangle, whereby the central end plate portion 35 is formed to have a truss structure. The "truss structure" is a structure organized in units of triangles in which force to be applied to the structure can be simplified to be borne as only axial force called as compressive force and tensile force, and is a structure which is lightweight and resistant to deformation generally. Accordingly, the central end plate portion 35 becomes lightweight and resistant to deformation due to the truss structure.

The central end plate portion 35 has the width W4 in the front-rear direction thicker than the width W5 in the front-rear direction of the left end plate portion 36L and the right end plate portion 36R. More specifically, while the end plate 3 has a flat internal surface abutting to the cell stack body 2, the external surface thereof which does not abut to the cell stack body 2 has a shape such that the central end plate portion 35 protrudes outwardly. Therefore, as compared to the end plate with a constant width, it is possible to improve bending strength and flexural rigidity with a lighter weight. Particularly, the central end plate portion 35, which receives a large load in the cell stacking direction from the cell stack body 2, can be improved in bending strength and flexural rigidity.

Incidentally, the left end plate portion 36L and the right end plate portion 36R include solid portions 36a, and the front fixing portion 43F and the rear fixing portion 43R of the side frame 4 are respectively fixed to the solid portions 36a of the left end plate portion 361, and the right end plate portion 36R, Therefore, the side frame 4 can be firmly fixed to the end plate 3 at a high rigidity portion.

The end surface of the bolt B fastening the end plate 3 with the front fixing portion 43F and the rear fixing portion 43R of the side frame 4 is disposed on a side of the cell stack body 2 in the front-rear direction compared to the outermost surface of the central end plate portion 35. Accordingly, it is possible not only to avoid the protrusion of the bolt B toward the front-rear direction, but also to receive an impact from the outside at the outer wall 32 of the end plate 3.

Further, the end plate 3 is provided with a structure fixing portion 37 to be fixed to the structure supporting the battery module 1 with a fixing tool such as a bolt and terminal fixing portions 38 and 39 to which the external connection terminal 23 is fixed with screws 24. The structure fixing portion 37 in this embodiment consists of round holes passing through the both left and right end portions (the left end plate portion 36L and the right end plate portion 36R) of the end plate 3 in the up-down direction. The one terminal fixing portion 38 in this embodiment consists of a round hole passing through the left-right central part (the inner wall 31 of the central end plate portion 35) of the end plate 3 in the up-down direction. The other terminal fixing portion 39 in this embodiment consists of a bottomed round hole processed in the one of left and right end portions (the left end plate portion 36L) of the end plate 3.

The terminal fixing portion 38 is formed to protrude inside the hollow portion 34 from the inner wall 31 of the central end plate portion 35. With such a terminal fixing portion 38, even when an impact is received from the outside, since the inner wall 31 is prevented from moving due to the deformation of the connection walls 33, it is also possible to prevent movement of the terminal fixing portion 38 provided in the inner wall 31. In addition, the terminal fixing portion 38 can be used as a structure fixing portion. Also, it may provide a structure fixing portion separately from the terminal fixing portion 38 in the inner wall 31.

The terminal fixing portions 38 and 39 are located on a side of the cell stack body 2 in the front-rear direction compared to the front fixing portion 43F and the rear fixing portion 43R of the side frame 4. For this reason, before an impact from the outside is transmitted to the terminal fixing portions 38 and 39, the impact can be received by the left end plate portion 36L and the right end plate portion 36R of the end plate 3 to which the front fixing portion 43F and the rear fixing portion 43R of the side frame are respectively fixed.

As described above, according to the battery module 1 in this embodiment, since the end plate 3 includes the inner wall 31 extending along the cell stack body 2, the outer wall 32 spaced from the inner wall 31 and facing the inner wall 31, the connection walls 33 connecting the inner wall 31 with the outer wall 32, and the hollow portions 34 formed by the inner wall 31, the outer wall 32, and the connection walls 33 and extending in the up-down direction, and the thickness W1 of the connection wall 33 is thinner than the thickness W2 of the inner wall 31, it is possible to protect the cell stack body 2 from an impact from the outside with the deformation of the connection walls 33. In addition, it is possible to prevent the cell stack body 2 from being deformed by increasing the thickness of the inner wall 31.

Since the thickness W1 of the connection walls 33 is thinner than the thicknesses W2 and W3 of the inner wall 31 and the outer wall 32, while the outer wall 32 receives an impact from the outside and the inner wall 31 protects the cell stack body 2, it is possible to absorb the impact from the outside with the deformation of the connection walls 33.

Since the central end plate portion 35 has a truss structure due to the hollow portions 34, it is possible to realize a structure which is lightweight and resistant to deformation.

Since the width W4 in the front-rear direction of the central end plate portion 35 is thicker than the width W5 in the front-rear direction of the left end plate portion 36L and the right end plate portion 36R, compared to the end plate with a constant width, it is possible to improve bending strength and flexural rigidity with a lighter weight.

Since the front fixing portion 43F and the rear fixing portion 43R of the side frame 4 are fixed to the solid portions 36a provided in the left end plate portions 36L and the right end plate portions 36R of the end plates 3, it is possible to firmly fix the side frames 4 to the end plates 3 at a high rigidity portion.

Since the end surface of the bolt B fastening the end plate 3 with the front fixing portion 43F or the rear fixing portion 43R is located on the side of the cell stack body 2 in the front-rear direction compared to the outermost surface of the central end plate portion 35, it is possible not only to avoid the protrusion of the bolt B, but also to receive the impact from the outside by outer wall 32 of the end plate 3.

Since even when the impact from the outside is received, the inner wall 31 is prevented from moving due to the deformation of the connection walls 33, it is also possible to prevent movement of the terminal fixing portion 38 by providing the terminal fixing portion 38 on the inner wall 31.

Since the terminal fixing portions 38 and 39 are located on the side of the cell stack body 2 in the front-rear direction compared to the front fixing portion 43F and the rear fixing portion 43R of the side frame 4, before the impact from the outside is transmitted to the terminal fixing portions 38 and 39, the impact can be received by the left end plate portion 36L and the right end plate portion 36R of the end plate 3 to which the front fixing portion 43F or the rear fixing portion 43R of the side frame 4 are fixed.

As described above, the structure fixing portion 37 may be provided instead of the terminal fixing portion 38 on the inner wall 31 or in addition to the terminal fixing portion 38 on the inner wall 31. In this case, even when the impact is received from the outside, since the inner wall 31 is prevented from moving due to the deformation of the connection walls 33, it is also possible to prevent movement of the structure fixing portion 37. Moreover, before the impact from the outside is transmitted to the structure fixing portion 37, the impact can be received by the left end plate portion 36L and the right end plate portion 36R of the end plate 3 to which the front fixing portion 43F and the rear fixing portion 43R of the side frame 4 are fixed.

Second Embodiment

Next, a battery module according to a second embodiment of the present invention will be described with reference to FIG. 4. However, only the differences from the first embodiment will be described, and the configurations common to the first embodiment will be denoted by the same reference numerals as in the first embodiment, so that the description of the first embodiment will be cited.

Figure 4:
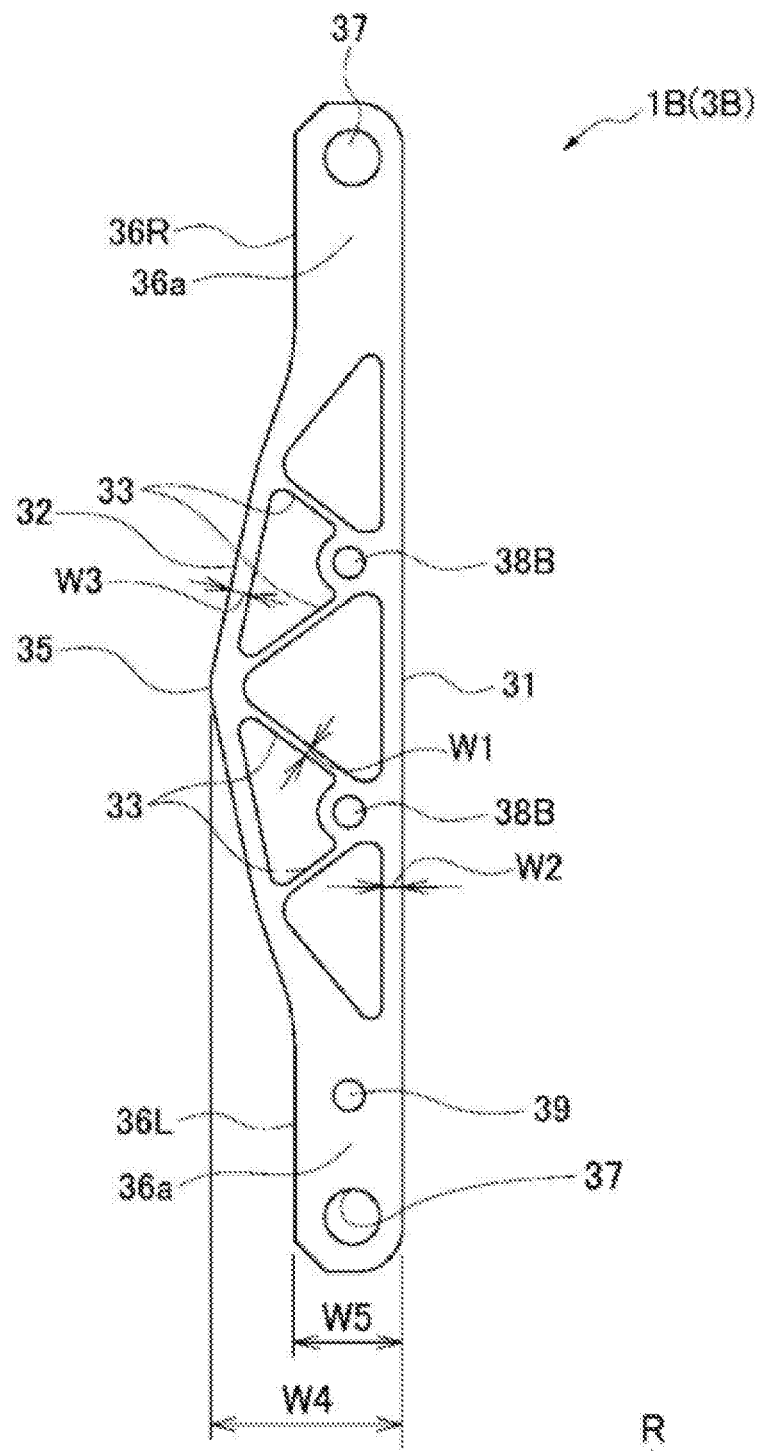
FIG. 4 is a plan view illustrating an end plate of a battery module according to a second embodiment of the present invention.
Figure 4:
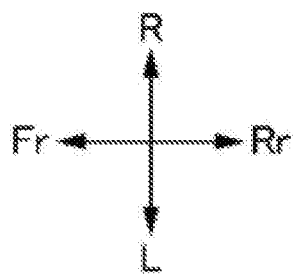

As illustrated in FIG. 4, the battery module 1B according to the second embodiment has the same configuration as that of the first embodiment except that a terminal fixing portion 38B provided on an end plate 3B is provided by utilizing a portion connecting the inner wall 31 and the two connection walls 33.

Third Embodiment

Figure 5:
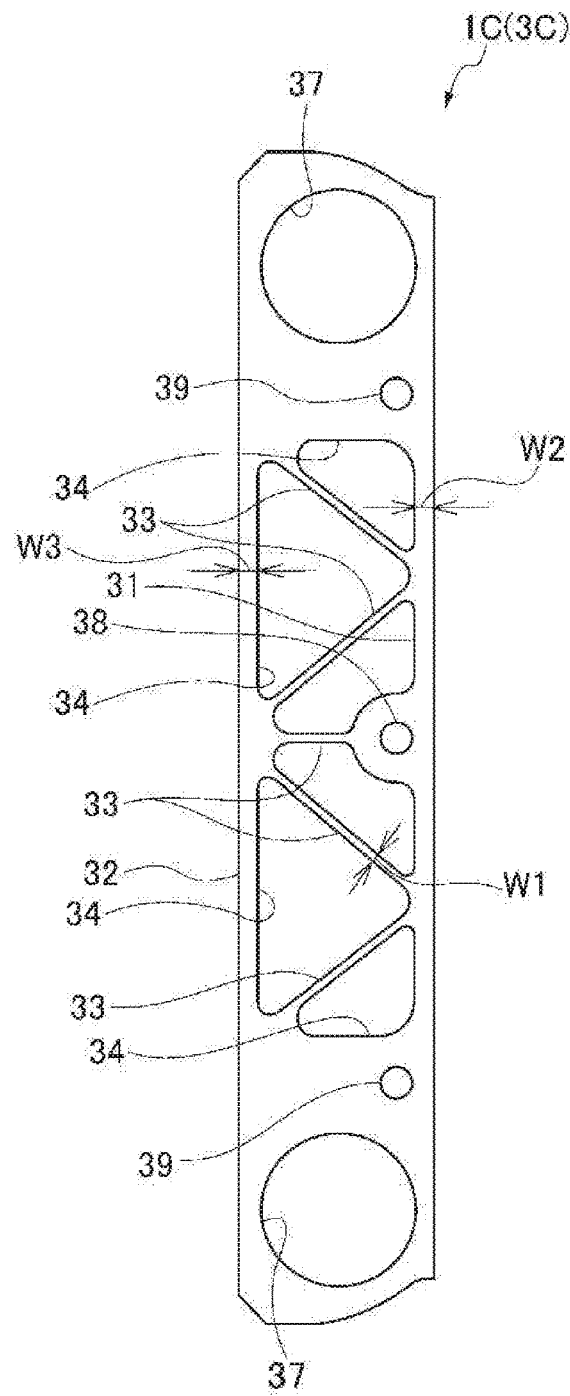
FIG. 5 is a plan view of main parts of a battery module according to a third embodiment of the present invention.
Figure 5:
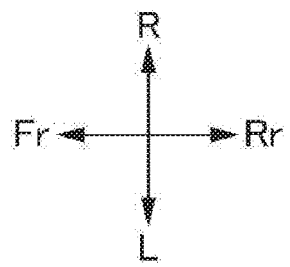

As illustrated in FIG. 5, a battery module 1C according to a third embodiment has the same configuration as that of the first embodiment, except that an end plate 3C has a constant front-rear width over the entire area in the left-right direction, and the outer wall 32 and the terminal fixing portion 38 are connected by the connection wall 33.

It is noted that the present invention is not limited to the above-described embodiments, but can be appropriately modified and improved.

The invention claimed is:

1. A battery module comprising:
a cell stack body that is constituted by a plurality of cells stacked in a front-rear direction and comprises a front surface, a rear surface, a left surface, a right surface, an upper surface, and a lower surface;
a pair of end plates disposed on the front surface and the rear surface of the cell stack body; and
a pair of side frames disposed on the left surface and the right surface of the cell stack body, wherein
the end plates each comprise:
an inner wall extending along the cell stack body;
an outer wall spaced from the inner wall and facing the inner wall;
a plurality of connection walls connecting the inner wall and the outer wall with each other;
a plurality of hollow portions formed by the inner wall, the outer wall, and the connection walls and extending in an up-down direction;
a left end plate portion;
a right end plate portion; and
a central end plate portion interposed between the left end plate portion and the right end plate portion in a left-right direction,
a thickness of the connection walls is thinner than a thickness of the inner wall,
a width of the central end plate portion in the front-rear direction is thicker than a width of the left end plate portion and the right end plate portion in the front-rear direction, and
the outer wall of the central end plate portion has inclined planes which come closer to a side of the cell stack body as the outer wall approaches from a central portion to the left end plate portion and the right end plate portion.

2. The battery module according to claim 1, wherein the thickness of the connection walls is thinner than a thickness of the outer wall.

3. The battery module according to claim 1, wherein the central end plate portion has a truss structure due to the hollow portions.

4. The battery module according to claim 1, wherein the battery module is supported by a structure, and the inner walls each comprise a structure fixing portion to be fixed to the structure supporting the battery module.

5. The battery module according to claim 1, wherein the cell stack body comprises external connection terminals, and
the inner walls each comprise a terminal fixing portion to which the external connection terminal is fixed.

6. The battery module according claim 1, wherein the left end plate portion and the right end plate portion each comprises a solid portion,
the pair of side frames each comprises:
a side frame body;
a front wraparound portion which turns along the front surface of the cell stack body from the side frame body; and
a rear wraparound portion which turns along the rear surface of the cell stack body from the side frame body,
the front wraparound portions comprise front fixing portions configured to be fixed to the solid portions provided in the left end plate portion and the right end plate portion of a front end plate of the pair of end plates, and
the rear wraparound portions comprise rear fixing portions configured to be fixed to the solid portions provided in the left end plate portion and the right end plate portion of a rear end plate of the pair of end plates.

7. The battery module according to claim 6, wherein
an end surface of a fastening member fastening the front fixing portion and the front end plate with each other is located on a side of the cell stack body in the front-rear direction compared to an outermost surface of the central end plate portion of the front end plate, and
an end surface of another fastening member fastening the rear fixing portion and the rear end plate with each other is located on a side of the cell stack body in the front-rear direction compared to an outermost surface of the central end plate portion of the rear end plate.

\* \* \* \* \*